(12) United States Patent
Aunbirk

(10) Patent No.: US 10,478,746 B2
(45) Date of Patent: Nov. 19, 2019

(54) PROCESS AND PLANT FOR PRODUCING A SOLID PRODUCT

(75) Inventor: Niels Aunbirk, Stenløse (DK)

(73) Assignee: ALFA LAVAL CORPORATE AB, Lund (SE)

( * ) Notice: Subject to any disclaimer, the term of this patent is extended or adjusted under 35 U.S.C. 154(b) by 897 days.

(21) Appl. No.: 14/383,255

(22) PCT Filed: Mar. 7, 2012

(86) PCT No.: PCT/EP2012/053908
§ 371 (c)(1),
(2), (4) Date: Jan. 13, 2015

(87) PCT Pub. No.: WO2013/131563
PCT Pub. Date: Sep. 12, 2013

(65) Prior Publication Data
US 2015/0136333 A1     May 21, 2015

(51) Int. Cl.
*B01D 1/14*     (2006.01)
*A23L 3/16*     (2006.01)
(Continued)

(52) U.S. Cl.
CPC .................. *B01D 1/14* (2013.01); *A23L 3/16* (2013.01); *A23L 19/09* (2016.08); *C11B 1/00* (2013.01); *C12C 13/00* (2013.01); *C12C 13/025* (2013.01)

(58) Field of Classification Search
None
See application file for complete search history.

(56) References Cited

U.S. PATENT DOCUMENTS 3,956,061 A * 5/1976 Young ..................... B01D 1/00
                                                   159/16.2
4,441,958 A * 4/1984 Teucci ................. B01D 1/0094
                                                   159/18
(Continued)

FOREIGN PATENT DOCUMENTS

EA      001955 B1      10/2001
EP      0 564 659 A1   10/1993
(Continued)

OTHER PUBLICATIONS

English translation of Office Action (Notice of Reasons for Rejection) dated Oct. 19, 2015, by the Japanese Patent Office in corresponding Japanese Patent Application No. 2014-560259. (4 pages).
(Continued)

*Primary Examiner* — Matthew D Krcha
(74) *Attorney, Agent, or Firm* — Buchanan Ingersoll & Rooney PC

(57) ABSTRACT

The present invention concerns a process for producing a solid product and a liquid product, comprising the steps of a. heating by direct steam injection a finely divided starting material, b. separating the heated starting material in the solid product and an aqueous liquid, c. heating and pressurizing the aqueous liquid, and d. reducing the pressure of the aqueous liquid thereby generating steam and the liquid product, wherein the steam generated in step d is returned to step a for injection into the finely divided starting material. The process suggests a solution for extracting the additional water appearing in the aqueous liquid due to condensed steam.

23 Claims, 10 Drawing Sheets

(51) Int. Cl.
*C12C 13/00* (2006.01)
*C12C 13/02* (2006.01)
*C11B 1/00* (2006.01)
*A23L 19/00* (2016.01)

(56) References Cited

U.S. PATENT DOCUMENTS

| | | | |
|---|---|---|---|
| 4,653,198 | A | 3/1987 | Alsaker |
| 5,511,640 | A | 4/1996 | Fukunaga |
| 5,545,384 | A | 8/1996 | Harato et al. |
| 5,551,640 | A | 9/1996 | Rajchel |
| 5,589,525 | A * | 12/1996 | Hunter ................ B01D 1/22 159/13.1 |
| 2003/0121851 | A1 | 7/2003 | Lee, Jr. |
| 2004/0071849 | A1 * | 4/2004 | Kikuchi ............. A23C 11/103 426/486 |
| 2004/0188340 | A1 * | 9/2004 | Appel ................. B01D 3/009 210/321.68 |
| 2004/0194634 | A1 * | 10/2004 | Succar ............... A23L 11/31 99/324 |
| 2005/0274668 | A1 | 12/2005 | Lee, Jr. |
| 2007/0095734 | A1 | 5/2007 | Lee, Jr. |
| 2008/0064906 | A1 | 3/2008 | Foody et al. |
| 2009/0050560 | A1 * | 2/2009 | Dos Santos Alves ................. B01D 21/0018 210/608 |
| 2009/0062581 | A1 * | 3/2009 | Appel ................. C10G 1/002 585/241 |
| 2011/0060132 | A1 | 3/2011 | Lewis |
| 2011/0192073 | A1 * | 8/2011 | Kale ..................... C11B 1/10 44/307 |

FOREIGN PATENT DOCUMENTS

| | | |
|---|---|---|
| EP | 0 671 129 A1 | 9/1995 |
| JP | S63-027506 A | 2/1988 |
| JP | S64-38037 A | 2/1989 |
| JP | H05-193931 A | 8/1993 |
| JP | 2010-280794 A | 12/2010 |
| JP | 2011-515509 A | 5/2011 |
| JP | 4743633 B2 | 8/2011 |
| JP | 2011-524246 A | 9/2011 |
| JP | 5422494 B2 | 2/2014 |
| RU | 2163827 C2 | 3/2001 |
| WO | 9939592 A1 | 8/1999 |
| WO | WO 03/043939 A2 | 5/2003 |
| WO | WO 2006/034590 A1 | 4/2006 |
| WO | 2009/108761 A1 | 3/2009 |

OTHER PUBLICATIONS

Notice of Allowance dated Sep. 12, 2016 by the Japanese Patent Office in corresponding Japanese Patent Application No. 2014-560259 (3 pgs).

International Search Report (PCT/ISA/210) dated Jan. 7, 2013, by the European Patent Office as the International Searching Authority for International Application No. PCT/EP2012/053908.

English translation of the Office Action (Decision on Grant) dated Mar. 21, 2016, by the Russian Patent Office in corresponding Russian Patent Application No. 2014140327. (5 pgs).

\* cited by examiner

PROCESS AND PLANT FOR PRODUCING A SOLID PRODUCT

INTRODUCTION

The present invention relates to a process for producing a solid product and a liquid product. The invention also relates to a plant for producing a solid product and a liquid product. The process offers the benefit of efficient heating of a starting material using direct steam injection while at a later stage removing at least a part of the condensed steam.

BACKGROUND ART

Methods for heating various finely divided materials are widely used in the industry. While many heating mediums may be used steam is generally preferred. In many processes involving food material, the starting material is heated indirectly to avoid heat damaging of the material, risk of contamination, and addition of water to the final product.

As an example of a closed circuit design using indirect heating is disclosed in U.S. Pat. No. 4,653,198 (Stord Bartz). The document describes a plant for two-stage heat treatment of animal or vegetable material. A heating medium which is used in a second heat treatment apparatus, which follows the first heat treatment apparatus, consist of a uncontaminated water/steam stream which is circulated in a closed circuit, that is to say separated from the heat medium of the first apparatus and from the treatment material of the second apparatus.

Direct injection of steam to the starting material offers a more efficient and faster heating due to the absent of heat exchanger surfaces to transfer the heat from the heating medium to the material being processed. EP 671 129 (Finnatec) describes a process and an apparatus for treatment of products in the food industry. In the known process steam is directly injected into a food material being processed. The water used for generating the steam has prior to the evaporation process been heated in countercurrent with the steam-heated food material. Furthermore, the water used for steam-generation has been removed in a preceding step, such as a step involving ultrafiltration, reverse osmosis, nanofiltration, and evaporation.

It is the purpose of the present invention to device a process and a plant that improves direct steam injection technology. While the direct injection of the steam into a material being processed result in a quicker heating process it also adds considerable amounts of condensed water to the product stream. The additional water dilutes the final product. The present invention suggests a method for extracting the additional water from the diluted product.

DESCRIPTION OF THE INVENTION

The present invention relates to a process for producing a solid product and a liquid product, comprising the steps of
a. heating by direct steam injection a finely divided starting material,
b. separating the heated starting material in the solid product and an aqueous liquid,
c. heating and pressurizing the aqueous liquid, and
d. reducing the pressure of the aqueous liquid thereby generating steam and the liquid product,
wherein the steam generated in step d is returned to step a for injection into the finely divided starting material.

According to the invention the surplus of water generated by the condensed steam in step a. is at least partly removed in step d by reducing the pressure of the heated and pressurized aqueous liquid. In certain methods the amount of water removed from the liquid product in step d by evaporation is more than the amount of water added by condensed steam in step a, which result in a concentrated liquid product.

The starting material may emanate from various sources selected from the vegetable, animal, marine field or mixtures thereof. Vegetable source materials include culture plants like olive, sugar beet, sugar cane, soy bean, wheat, rice, corn, palm oil, wine grape, paper pulp, beer wort, and potato. Marine source materials include cod liver oil and blubber. Examples of starting materials from the animal field is various meat products selected form the group comprising cattle, pigs, chicken, and turkey. An example of a starting material including mixtures of source materials is sludge.

The starting material may have been pre-treated before being subjected to the present invention. Examples of pre-treatments include mincing, heating, ageing etc.

The starting material may have any form for it to be conveniently conveyed to the first heating unit. Suitably, the starting material is conveyed to the first heating unit by a conveyer, by hand tools, or by pump. When delivered to the first heating unit by pump, the starting material is suitably finely divided. The first heating unit is conveniently of the continuous type in which the starting material is received continuously from a feeding pump and delivered continuously to the subsequent process step.

In the first heating unit steam is injected directly into the starting material to be treated. Direct steam injection involves the discharge of a series of steam bubbles into the starting material. The steam bubbles condense and give up their heat to the surrounding material. The steam may be forced at a high rate into the material to be heated to obtain an almost immediately heating, i.e. a heating to the desired temperature within 1-5 minutes, which should be compared to around 15 minutes is a conventional heating device. A fast heating rate ensures a high volume stream through the first heating unit.

The temperature may be chosen according to the treatment desired for the starting material. Generally, the starting material is heated to a temperature of 35° C. or above. If it is desired to maintain the enzyme activity of the starting product, the temperature is generally not increased above 40° C. If, however, deactivation of the enzymes in the starting product is of importance for the characteristics of the final product, the temperature is usually above 50° C. In the event it is desired to perform pasteurization the product may according to the High Temperature Short Time (HTST) procedure be heated to 72° C. for 15-20 seconds. In the event a steam cooking is intended the starting material may be heated to above 90° C. and the pressure may be increased, e.g. to a pressure of 1-3 bara. Higher temperatures and/or pressures may be selected if the intended treatment of the starting material so requires.

The heated starting material is subjected to a separation process to obtain a separate solid product and an aqueous liquid. The term "Solid product" as used in the present description and the appending claims usually relates to a product comprising certain dry matter content and a remaining liquid component which is not separated out in the separation step. The solid product may be treated further in subsequent steps, which are not the subject of the present application. The term also covers a lighter or heavier phase incompatible with water, such as a vegetable, marine or animal oil/fat.

The term "liquid product" refers to a product which comprises water as the main component and a minor amount of non-volatile component such as salts, lipophilic substances, proteins, precipitated material etc.

The separation may occur in various types of separation units, including membrane filtration units and separation units based on a centrifugal force. Membrane filtration units include microfiltration, nanofiltration, and ultrafiltration. Separation units based on a centrifugal force includes centrifuges, such as a decanter centrifuge. The centrifuge may be a two phase of a three phase decanter centrifuge. When minced meat is used as the starting material the separation unit is generally selected as a two or three phase decanter centrifuge to provide for an efficient processing of the heated starting material.

The separation step may be performed in two or more steps. Thus, in a certain embodiment of the invention the heated starting material is subjected to two two-phase decanter centrifuges to deliver an aqueous liquid, a solid product and an oil. The first two-phase decanter centrifuge delivers the aqueous liquid and a wet solid phase containing a lipophilic substance. The wet solid phase is treated in a subsequent decanter centrifuge to deliver a dryer solid phase and an oil or fat component. Alternatively, the latter step is substituted with an extraction step where the wet solid product is extracted by an extraction agent, such as hexane or ethanol in order to recover the lipophilic component.

Prior to the pressurizing and heating of the aqueous liquid, the aqueous liquid may be processed or temporarily stored. As an example, the aqueous liquid may be subjected to a treatment according to which the amount of optionally present lipophilic, colloidal or solid components is reduced. If the aqueous liquid contains minor amounts of lipophilic components these may be removed or reduced in amount in a clarification centrifuge. To absorb irregularities in the operation of the process according to the present invention it may be advantageous to include a buffer tank prior to the heating treatment.

The aqueous liquid is pressurized and heated in a combined or in separate steps in any order. The aqueous liquid may be pressurized using any suitable pump. In general, the pump is centrifugal pump or a pump of the positive displacement type, including rotary lobe pump, progressive cavity pump, rotary gear pump, piston pump, diaphragm pump, screw pump, gear pump, hydraulic pump, vane pump, regenerative (peripheral) pump, peristaltic pump, and rope pump. The pump should be able to provide a pressure of 2 bara or more, preferably 3 bara or more.

The heating may occur in a single, two or more steps. In a first heating step, the aqueous liquid may be heated in a heat exchanger in countercurrent with a hotter stream occurring later in the process. The hotter stream is usually downstream of the reducing step d. Herein, such treatment is termed a pre-heating step. After the optional pre-heating step, the aqueous liquid is heated in a main heating unit using a heating medium. The heating medium is usually steam but may be heated oil or a similar heat transferring material. The heat in the main heating step is generally transferred indirectly to the aqueous liquid in a heat exchanger. The aqueous liquid is generally heated to a temperature of 120° C. or above, such as 130° C. or above and preferably 140° C. or above.

The reduction of the heated and pressurized aqueous liquid is generally performed in a flash evaporator. Flash (or partial) evaporation is a process step which occurs when the aqueous liquid stream undergoes a reduction in pressure by passing through a throttling valve or other throttling device. By reducing the pressure in the throttling valve steam is generated. The steam is used in step a. for heating of the starting material and the remaining aqueous liquid is used in subsequent process steps, treated further or discharged.

The water depleted aqueous liquid may partly or entirely be recycled to the heating and pressurizing step c. By recycling the aqueous liquid the non-volatile components will be concentrated. In certain specific processes the concentrated aqueous liquid product is the desired product for further processing. In a certain aspect of the invention the water depleted aqueous liquid phase is increased relative to the aqueous liquid phase 50% or more, preferably 100% or more.

The present invention also relates to a plant for producing a solid product and a liquid product, comprising
a first heating unit using steam for heating a finely divided starting material,
a separation unit capable of separating the finely divided starting material into the solid product and an aqueous liquid,
a pump for pressurizing the aqueous liquid,
a second heating unit for heating the aqueous liquid, and
a flash evaporator generating steam and the liquid product,
wherein the flash evaporator and the first heating unit are connected for conveying steam from the flash evaporator to the first heating unit, thereby heating the finely divided starting material with steam.

The first heating unit using steam for heating the finely divided starting material can cut fuel costs dramatically compared to indirect heating methods because all of the available energy from the steam is absorbed by the starting material. Typically, the efficiency of direct steam injection is increased 25% or more compared to indirect heating types like shell-and-tube or plate-and-frame heat exchangers.

The first heating unit may be designed for an optimal mixing of the steam and the starting material. In a certain embodiment, the steam is introduced in the unit through a centrally oriented injection tube having apertures allowing for the steam to exit. Co-axially around the injection tube a pipe for the starting material is provided. Suitably, the pipe for the starting material is provided with helical flights at the area of apertures in the injection tube to assure an effective mixing of the steam and the starting material.

The separation unit capable of separating the finely divided starting material into a solid product and an aqueous liquid is typically a decanter centrifuge. Separation in a decanter centrifuge takes place in a horizontal cylindrical bowl equipped with a screw conveyer. The heated starting material enters the bowl through a stationary inlet tube and is accelerated smoothly by an inlet distributor. The centrifugal force that stems from the rotation then causes sedimentation of the solids on the wall of the bowl. The conveyer rotates in the same direction as the bowl but at a different speed, thus moving the solids towards the conical end of the bowl. The cake leaves the bowl through the solids discharge openings into the casing. Separation takes place throughout the entire length of the cylindrical part of the bowl, and the aqueous liquid leaves the bowl by flowing over adjustable plate dams into the casing. The decanter centrifuge used in the present invention may be a two-phase or a three phase decanter centrifuge.

The aqueous liquid may be supplied directly to a heating unit or may be temporarily stored in a buffer tank. If a buffer tank is present it may absorb the production irregularities to allow for controlled delivery of aqueous liquid in the subsequent process steps. In certain embodiments it may be advantageous to maintain a certain temperature or increase the temperature of the aqueous liquid in the buffer tank by supplying steam through piping from the flash evaporator. The maintained or increased temperature in the buffer tank may prevent a component from precipitating out of the aqueous liquid.

The aqueous liquid may be heated in a single, two or more units. If only a single heating unit is used the aqueous liquid is transferred directly to the second heating unit. However, it is generally possible to pre-heat the aqueous liquid from the buffer tank in a pre-heater before it is received by the second heating unit. The pre-heating unit may be capable of increasing the temperature of the aqueous liquid and decrease the temperature of the water depleted aqueous liquid.

DETAILED DESCRIPTION OF THE DRAWINGS

FIG. 1 discloses the general flow chart of the process.

FIG. 2 discloses a flow chart of an embodiment in which the water depleted aqueous liquid is recycled to the second heating unit.

FIG. 3 discloses a flow chart of an embodiment in which a pre-heater is included for heat-exchanging the aqueous liquid stream with the water depleted aqueous liquid stream.

FIG. 4 discloses a flow chart of an embodiment in which a three phase decanter centrifuge is used for treating skimmings.

FIG. 5 discloses a flow chart in which minced animal tissue is treated.

FIG. 6 discloses a flow chart in which animal blood is treated.

Figure 10:
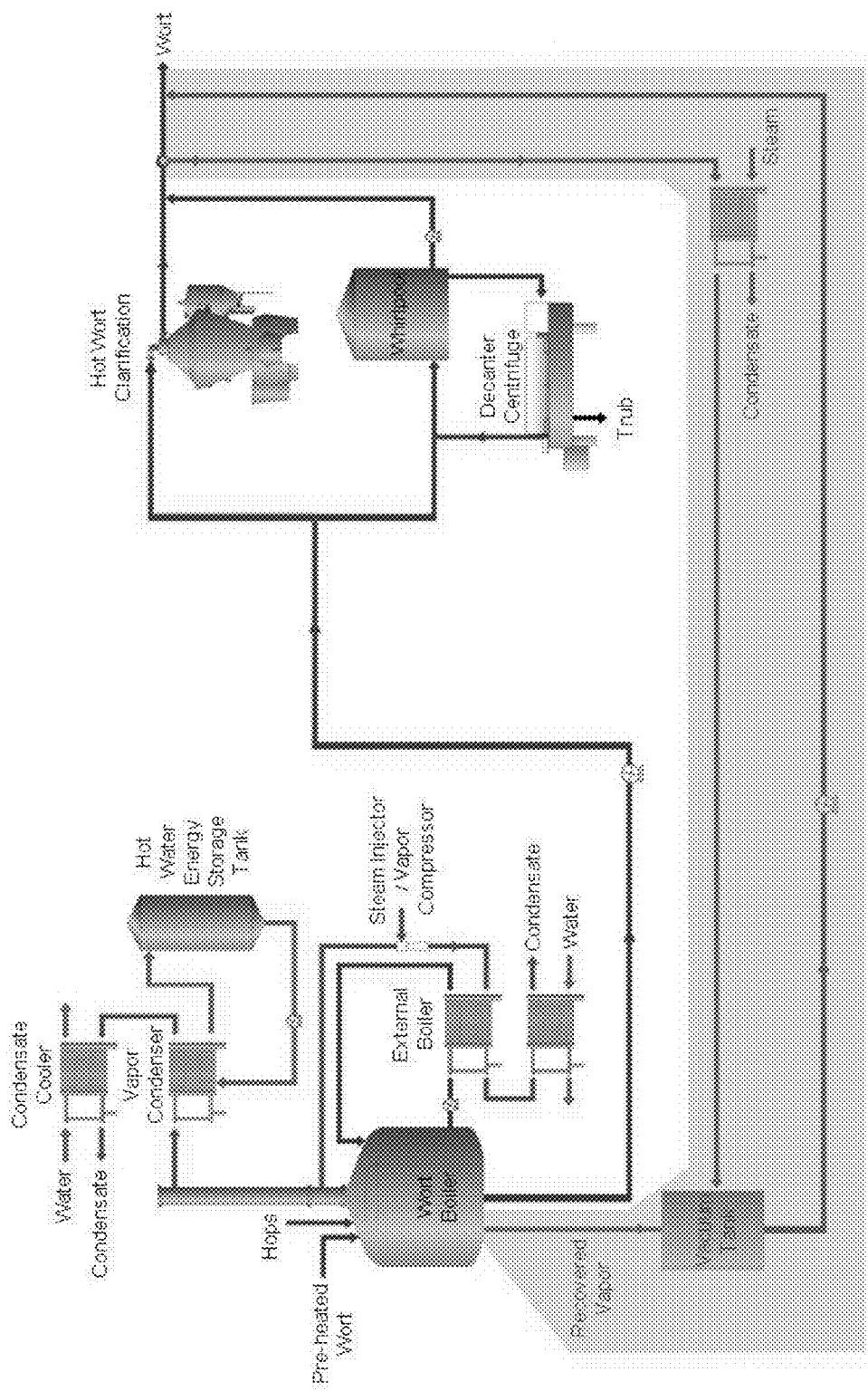

FIG. 10 discloses an embodiment treating wort for beer brewing.

DETAILED DESCRIPTION OF THE INVENTION

Figure 1:
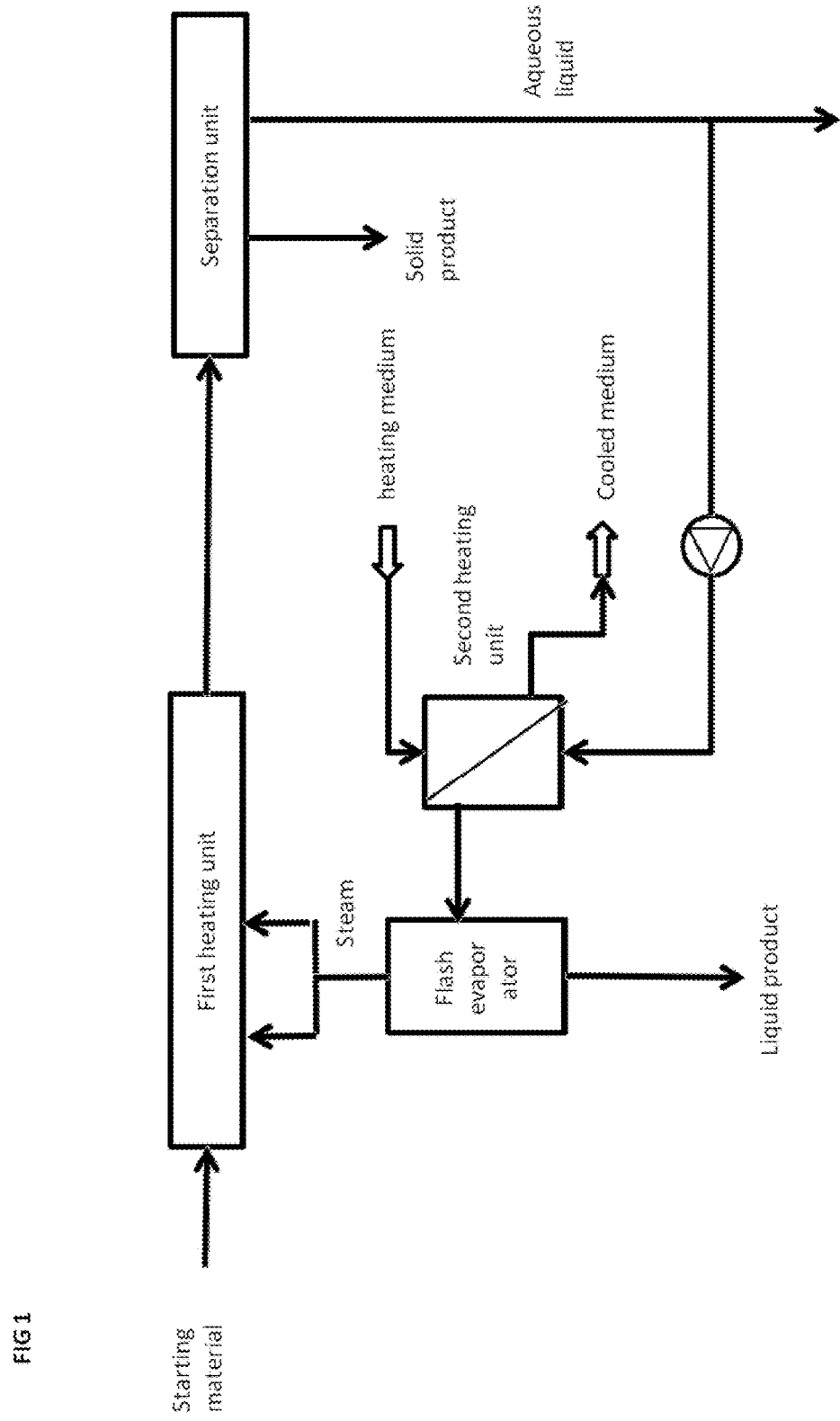

FIG. 1 discloses the general outline of the process according to the present invention. The finely divided starting material enters the first heating unit as a first step. The starting material may be selected among various sources from the vegetable, animal, marine field or mixtures thereof. An example includes minced meat or fish. The first heating unit is suitably a direct steam injection heater. Furthermore, the direct steam injection heater is preferably of the continuous type in which the starting material is continuously conveyed to the direct steam injection heater. An example of direct steam injection heater of this type is Pick Constant Flow Direct Steam Injection Heater from Pick Heaters Inc. The first heating unit receives steam from a flash evaporator as disclosed below.

The starting material may have any suitable temperature at the entrance of the first heating unit, such as from 5° C. to 70° C. Dependent on the nature of the starting material being processed the temperature of the heat-treated starting material leaving the first heating unit is generally above 35° C., such as above 45° C., preferably above 60° C. In the event a minced meat material is processed the temperature at the exit of the steam injection heater may be 90-100° C. and the pressure is in the range of 1.1 to 3 bara.

The heated starting material is subsequently transferred to the separation unit. In the separation unit the heated starting material is separated into a solid product and an aqueous liquid. The aqueous liquid phase comprises at least a part of the condensed steam injected in the first heating unit. The separation unit may be a membrane filtration unit, gravitational separation unit, decanter centrifuge, belt filter, filter press, rotary vacuum-drum filter, etc. Alfa Laval offers a range of decanter centrifuges generally preferred for the separation step. When minced meat is used as the starting material, the separation unit is generally selected as a two or three phase decanter centrifuge to provide for an efficient processing of the heated starting material.

The solid product may be used as such or treated further. Further treatment may include subjecting the solid product to an extraction procedure or further drying. The aqueous liquid is pressurized by a pump to a desired pressure and is conveyed to the second heating unit, wherein the aqueous liquid is heated to a temperature above boiling point at the selected pressure. The aqueous liquid is indirectly heated in the second heating unit by a heating medium usually selected as steam. Various apparatuses are suitable for this operation, including plate heat exchangers, shell-and-tube heat exchangers, spiral heat exchangers, and all-welded heat exchangers. Usually a plate heat exchanger is used for sanitary reasons.

The heated and pressurized aqueous liquid is flashed to generate steam and the liquid product, i.e. the aqueous liquid reduced in water content. The steam is conveyed in suitable piping to the first heating unit, for heating of the starting material.

In specific example 1000 kg/h minced meat is introduced into the first heating unit. The minced meat is heating using 15.4 kg/h steam to obtain a temperature of 95° C. The heated minced meat is separated in a two phase decanter centrifuge, resulting in a solid portion of 500 kg/h and an aqueous liquid fraction (stick water) of 515.4 kg/h. The aqueous liquid contains 1.2% by weight dry matter. 300 kg/h of the aqueous liquid is pressurized to a pressure of 4.1 bara and the temperature is increased to 144° C. in the second heating unit using indirect heating with steam having a pressure of 6 bara. In the flash evaporation unit the amount of steam indicated above is generated and the remaining water deprived aqueous liquid is discarded.

Figure 2:
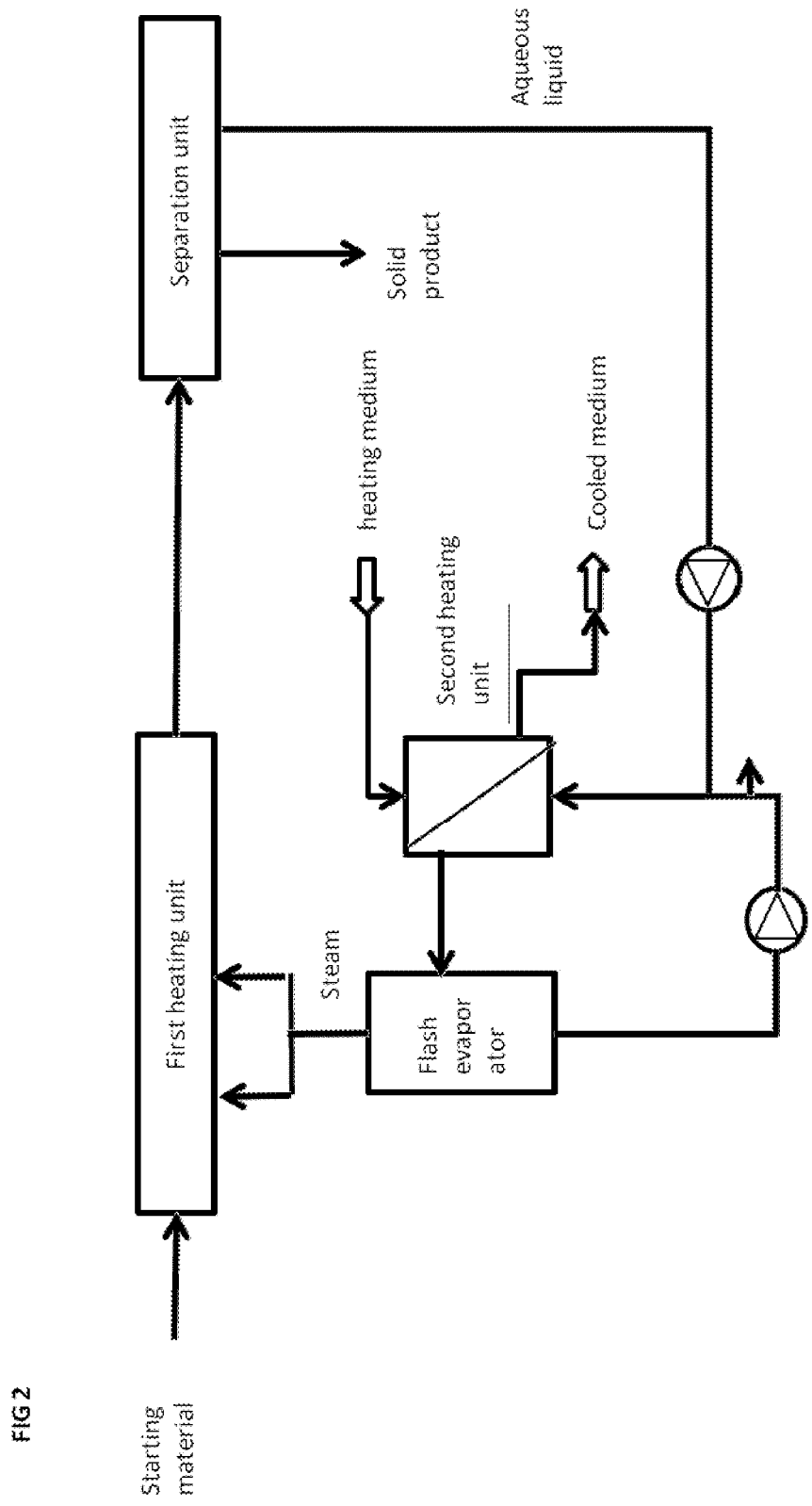

FIG. 2 discloses a refinement of the embodiment of claim 1, in which part of the water deprived aqueous liquid is recycled to the second heating unit. The recycling results in further concentration of the water deprived aqueous liquid. Generally, the water depleted aqueous liquid is concentrated until a concentration of about 5% by weight or more is obtained.

Figure 3:
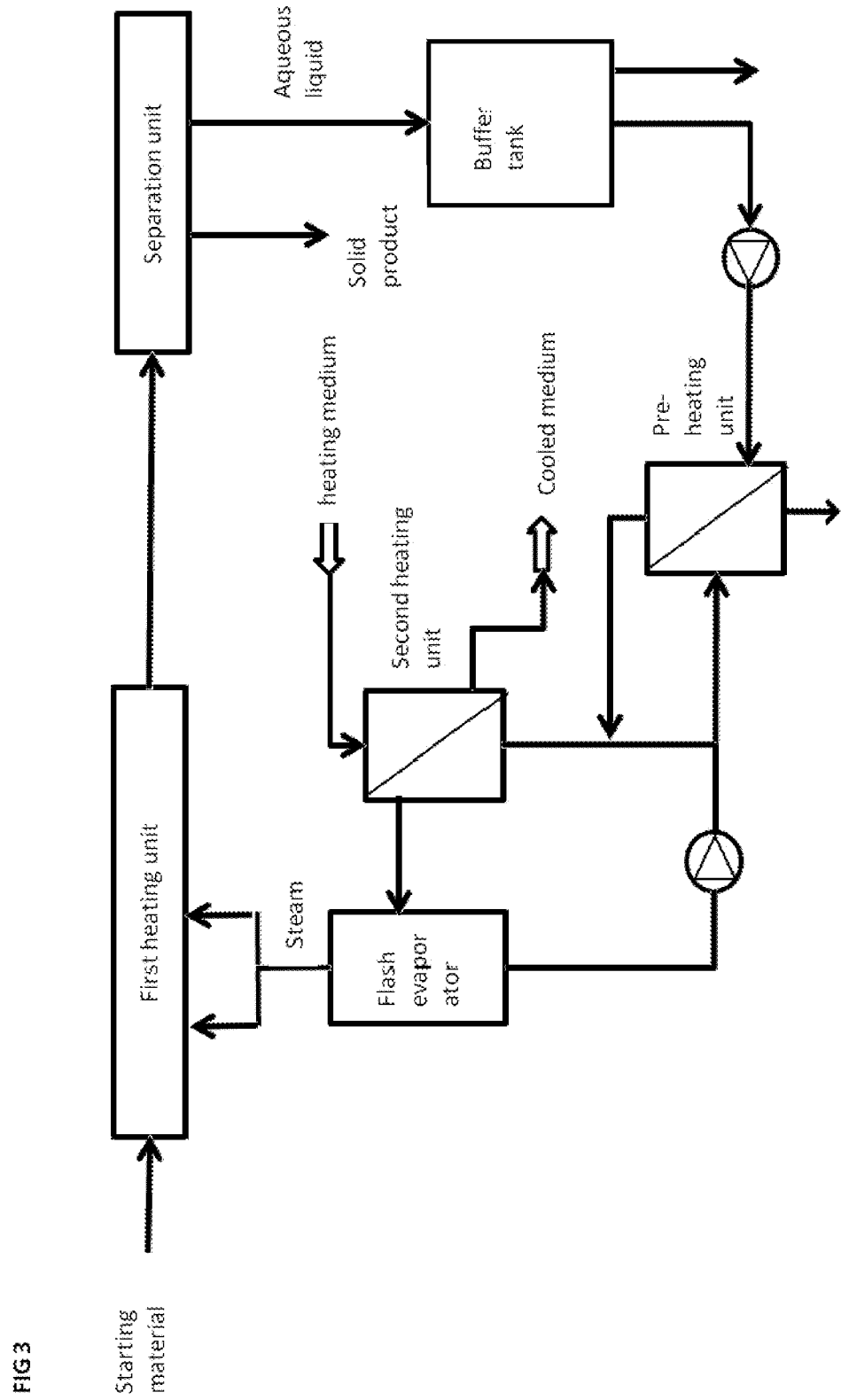

FIG. 3 discloses a further refinement of the embodiment of FIG. 2, in which the concentrated aqueous liquid is heat exchanged in a pre-heating unit with the aqueous liquid from the separator unit. Furthermore, the aqueous liquid is temporarily stored in a buffer tank. The stream from the buffer tank and/or the stream from the pre-heating unit may be collected as the liquid product. The liquid product is also referred to as stick water when the starting material is minced meat. Stick water contains valuable nutrition components for use in other processes.

Figure 4:
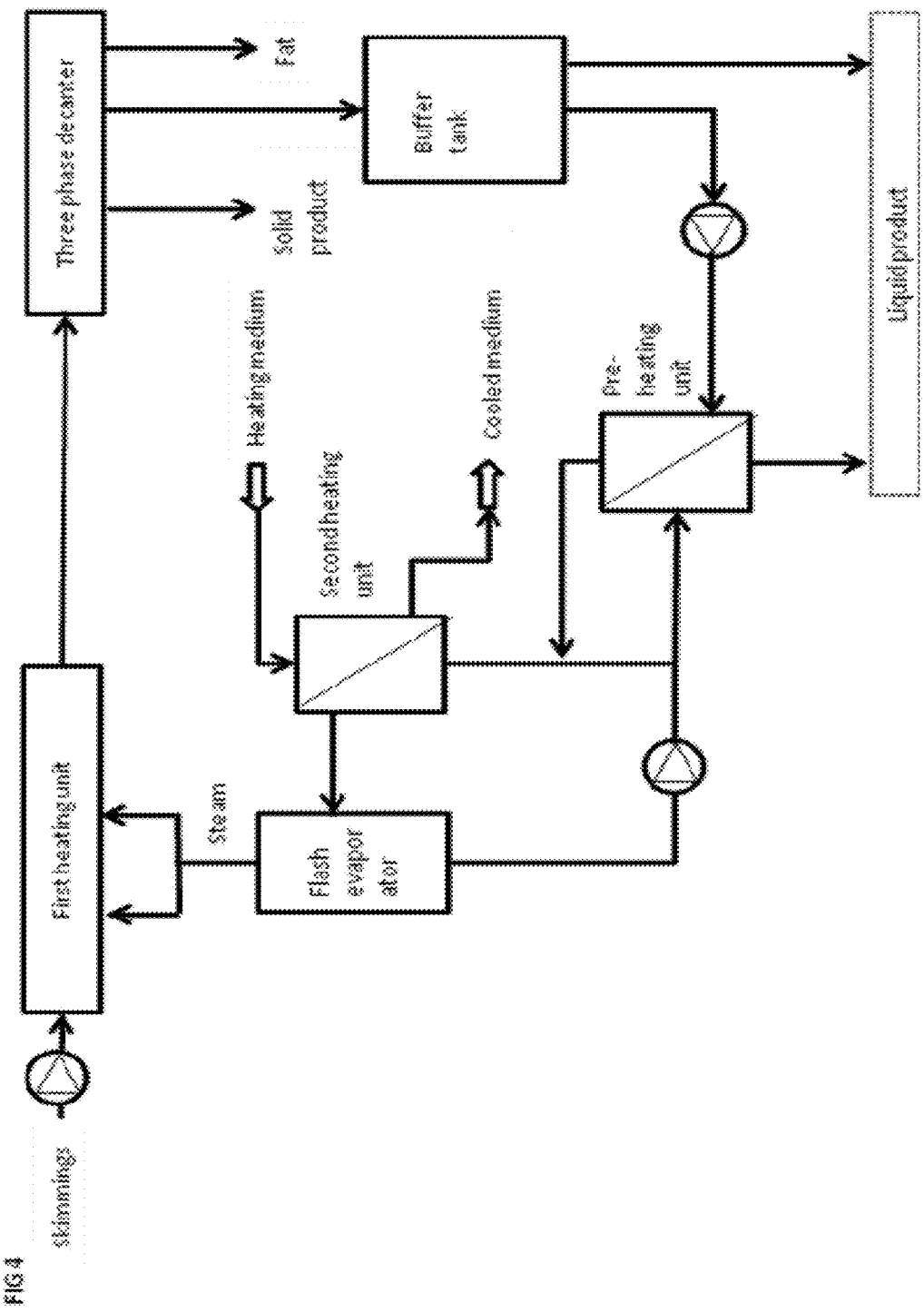

FIG. 4 discloses a flow chart of an embodiment in which a three phase decanter centrifuge is used for treating skimmings from meat and poultry. The skimmings are initially heated in the first heating unit, e.g. Pick Constant Flow Direct Steam Injection Heater to produce a mixture of fat, aqueous phase and suspended try matter. The heat treated skimmings are transferred to a three phase decanter, which may be selected as Centriskim, obtainable from Alfa Laval. The Centriskim process provides an inexpensive solution for recovering a fat fraction, an aqueous liquid phase and a wet concentrated solid phase. After this reduction process, the solid phase usually comprises less than 15% of the original weight, and fat recovery typically amounts to 10-15%. The defatted and dewatered solid product can be dried for feed purposes or used in other recycling solutions. Depending on both the freshness of the skimmings and the flotation chemicals used, the recovered fat is usually of a lower quality. However, fresher skimmings are usually acceptable as a direct feed-grade product, while lower grades are only used in technical applications. The aqueous liquid is treated as indicated for FIG. 1-3 above.

Figure 5:
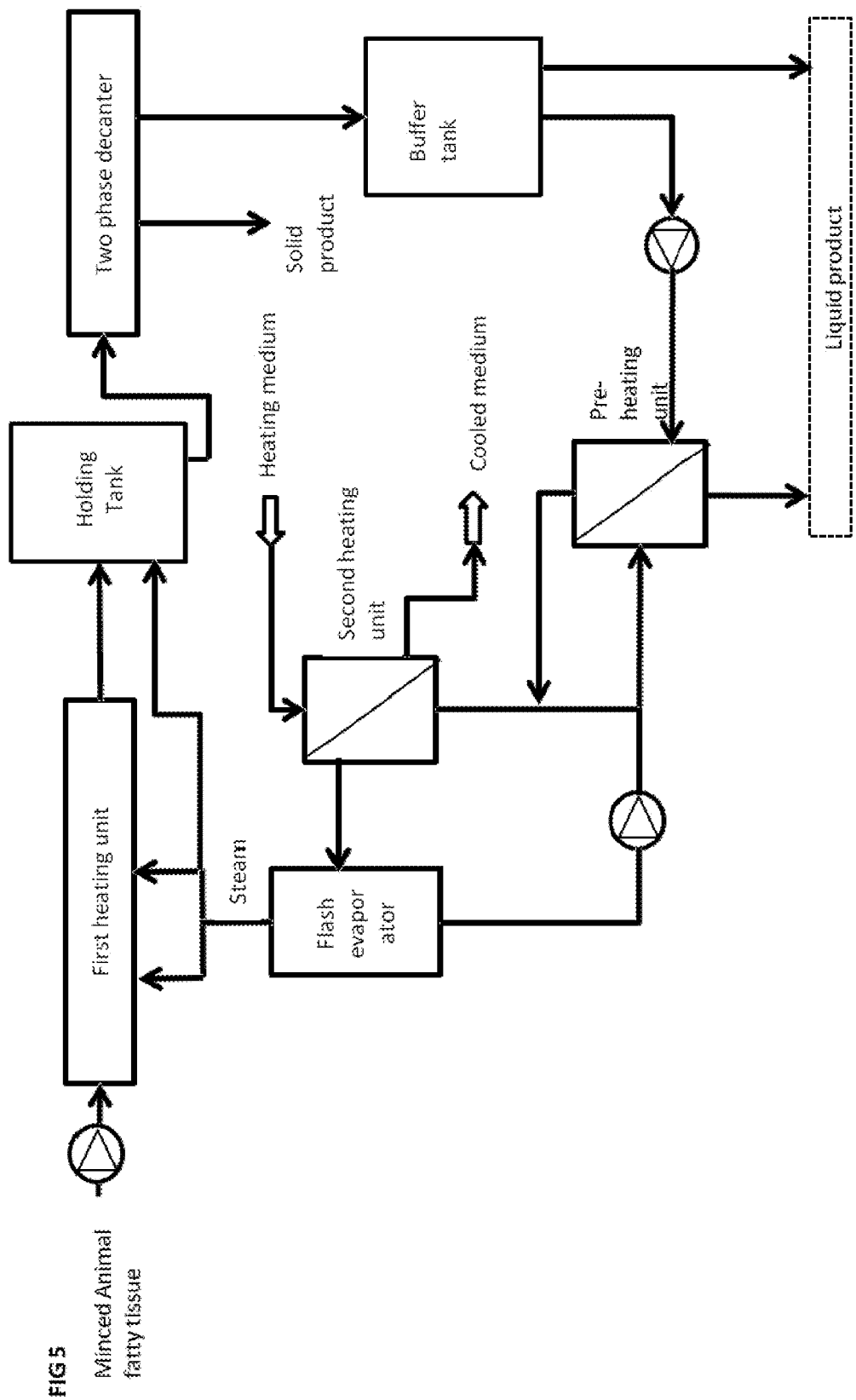

FIG. 5 discloses a flow chart of a process in which minced animal tissue is treated. The minced animal fatty tissue is initially fed by a pump to the first heating unit, e.g. Pick Constant Flow Direct Steam Injection Heater. The product of this process step is temporarily stored in a Holding tank. The temperature of the heat treated tissue is maintained or slightly increased by supply of steam from the flash evaporator. Subsequently, the content of the tank is supplied to a two phase decanter. The decanter separates the heat treated minced animal fatty tissue into a solid product (wet solid matter) and an aqueous liquid, which is stored temporarily in a buffer tank. The stored aqueous liquid is pressurized by a pump to a pressure of 3 to 5 bara and transferred to a pre-heating unit. Subsequently the aqueous liquid is heated in the second heating unit to a temperature of about 140-150° C. and throttled in the flash evaporator to generate steam, which is supplied to the first heating unit and the holding tank. A part of the water deprived aqueous liquid is recycled to the second heating unit and another part of the steam is used for heat exchange in the pre-heating unit. A liquid product is recovered from the combined streams from the pre-heating unit and the buffer tank.

Figure 6:
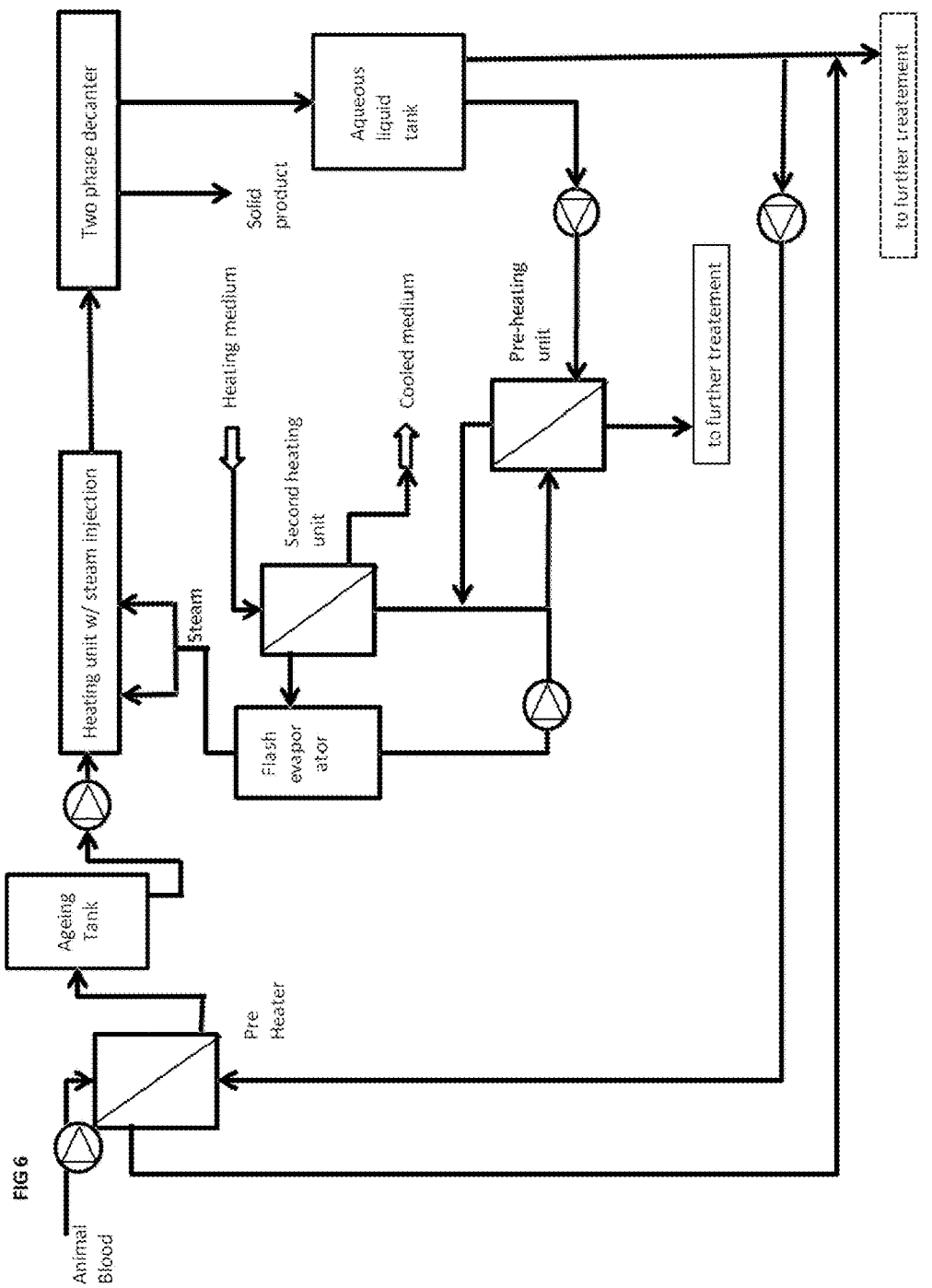

FIG. 6 discloses a flow chart of a process in which animal blood is treated. The raw animal blood is initially pre-heated to a temperature of about 45° C. and stored in an ageing tank. The aged blood is subsequently introduced into the direct steam heated first heating unit and heated to a temperature of about 95° C. The heated blood is separated into blood water (aqueous liquid) and a wet solid matter. The wet solid matter is dried in a dryer to obtain blood meat (not shown on the drawing). The blood water is temporarily store in an aqueous liquid tank. In the tank the temperature may drop to about 85° C. A part of the blood water is conveyed to a pre-heating unit. In the pre-heating unit the blood water is heat exchanged with a stream obtained from the flash evaporator to obtain a temperature of about 98° C. The dry matter of the blood water is usually about 1.2% by weight at this stage. The blood water is pressurized by a pump to a pressure of 4.1 bara and supplied to the second heating unit, wherein the temperature is raised to 144° C. The blood water is indirectly heated by steam at about 6 bara and 159° C. By flashing of the heated and pressurized blood water steam is generated, which is supplied to the first heating unit. The water deprived blood water is partly recycled to concentrate the stream further, while another part of the stream is collected for further treatment. A second stream of blood water from the aqueous liquid tank is used to preheat the raw animal blood, as described above, and the cooled stream from the preheater is collected for further treatment. Optionally, the streams from the two preheaters may be collected for further treatment.

Figure 7:
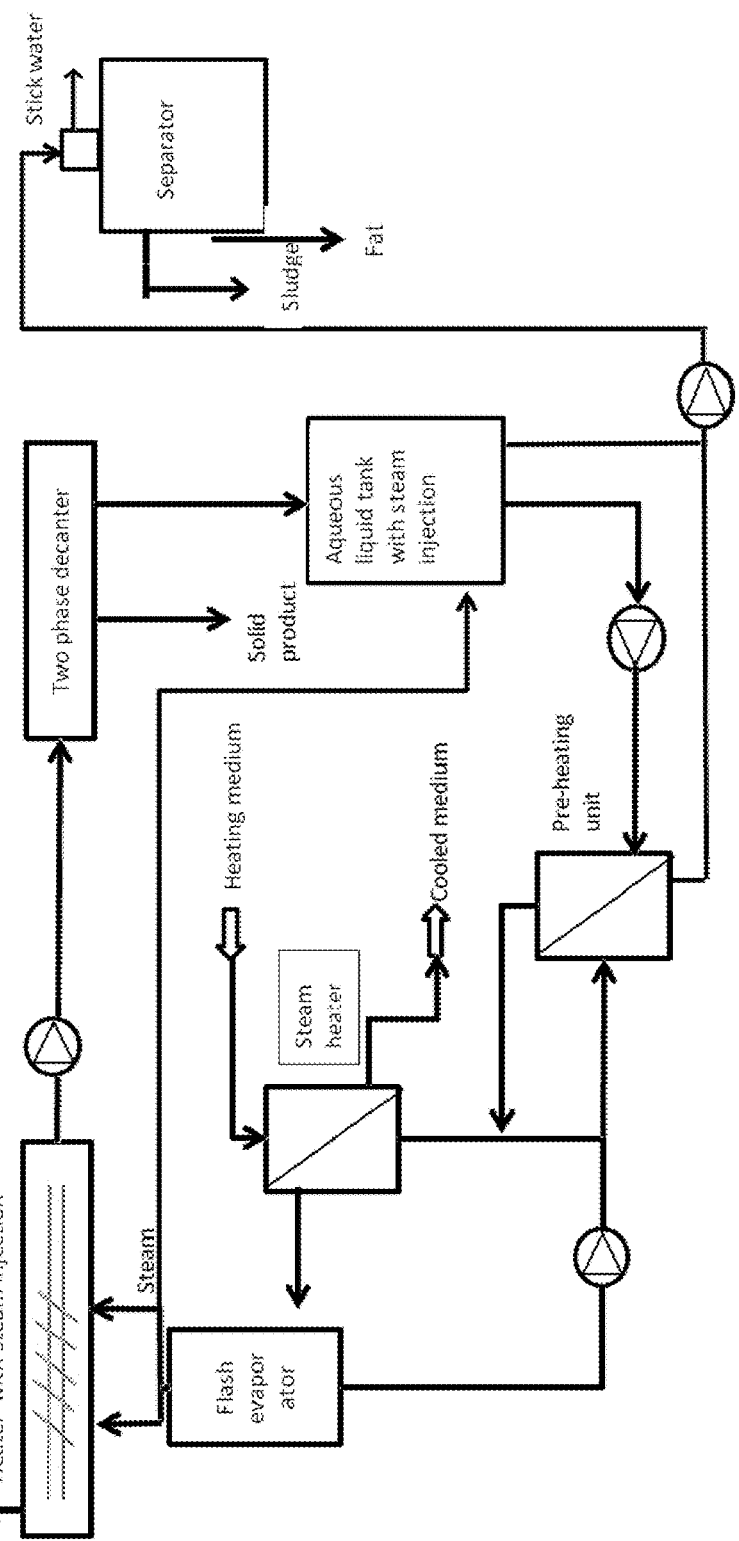
FIG. 7 shows an embodiment in which animal bone material is treated by the present process.

FIG. 7 shows an embodiment in which animal bone material is treated by the present process. Initially, the animal bone material is minced in a not shown device. The finely divided starting material is introduced into a heater with steam injection. The temperature is increased to 65° C. to 90° C. depending on the raw material used and the end product desired. Fully automatic control of the temperature profile can be obtained through built-in temperature sensors, available as an optional instrumentation. The heat-treated animal bone material is transferred to a two phase decanter centrifuge, which produces a solid product, often termed bone greaves, and an aqueous liquid. The bone greaves may be dried or processed otherwise, while the aqueous liquid is temporarily stored in a tank. The tank is supplied steam from the flash steam evaporator for maintaining or increasing the temperature. Part of the aqueous liquid is pressurized by a pump to a pressure of 3 to 5 bara and transferred to a pre-heating unit. Subsequently, the aqueous liquid is heated in the second heating unit to a temperature of about 140-150° C. and throttled in the flash evaporator to generate steam, which is supplied to the first heating unit and the holding tank. A part of the water deprived aqueous liquid is recycled to the second heating unit and another part of the stream is used for heat exchange in the pre-heating unit. The cooled stream from the pre-heating unit is combined with a stream from the aqueous liquid tank and transferred to a separator unit. The separator unit may in a certain embodiment be a high-speed, 3-phase separator, which generates a fat phase, a solid phase (fines) and process water. The fines may be combined with the starting material and introduced into the first heating unit.

Figure 8:
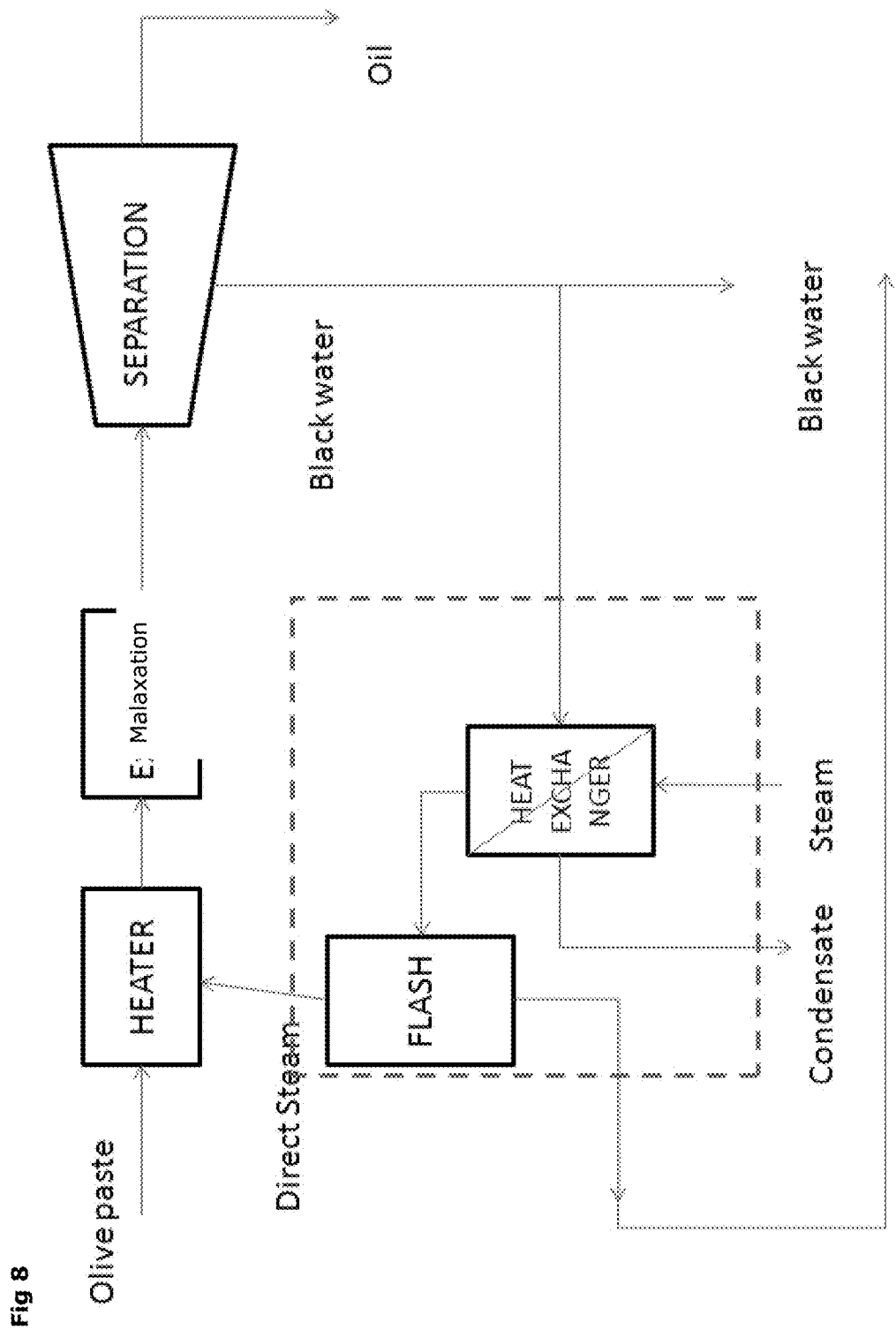
FIG. 8 shows an embodiment in which olive paste is treated.

FIG. 8 shows an embodiment in which olive paste is treated. Initially, the olives are crushed to a fine paste. This can be done by e.g. a hammer crusher, disc crusher, depitting machine, or knife crusher. The olive paste is then heated to a temperature of about 27° C. with steam in a first heating unit, e.g. Pick Constant Flow Direct Steam Injection Heater. Besides the condensate from the steam used for heating further amounts of water may be added, especially when a three phase decanter is used as the separation unit. The heated olive paste is subjected to a malaxation process. In the malaxation process the heated paste is subjected to slowly churning or mixing, typically for 20 to 60 minutes. The churning allows the smaller droplets of oil released by the crushing process to aggregate and be more easily separated. Oil yield is proportional to the temperature and mixing time. In certain embodiments it may be desired to increase the temperature. However, the use of higher temperatures and longer mixing times also increases oxidation of the oil and therefore decreases shelf life. It may be advantageous to use a blanket of inert gas, such as nitrogen or carbon dioxide over the olive paste to reduce the oxidation. This allows an increased yield without compromising the quality of the oil.

After the malaxation is complete, the treated paste is conveyed to a phase separator. The separation unit separates the treated paste in oil (solid product in terms of the claims) and an aqueous liquid, which is usually termed black water. A part of the black water is indirectly heated to a temperature of 144° C. in a heat exchanger and pressurized to 4-5 bara. The heated and pressurized black water is subjected to a sudden reduction of the pressure to liberate steam. The steam is transferred to the direct steam heater used in the previous step. The remaining aqueous liquid is subjected to further treatment or discarded. The part of the black water leaving the process directly from the separation unit may be mixed with the concentrated black water leaving the flash vessel, or treated separately.

The separation unit used in the present process is usually a two or three phase decanter centrifuge. When a three phase decanter is used, the oil may be recovered as the light phase and black water may be recovered as the intermediate phase whereas pomace is recovered as the heavy solid phase. As a part of the oil polyphenols is washed out due to the addition of water it may be desired to use a two phase decanter centrifuge. Sacrificing part of its extraction capability, it uses less added water thus reducing the phenol washing. The olive paste is separated into two phases: oil and wet pomace. This type of decanter, instead of having three exits (oil, water and solids), has only two. The water is expelled by the decanter coil together with the pomace. This wetter pomace is heated to a temperature between 45° C. and 50° C. and treated in a two phase decanter centrifuge to produce a dryer pomace and the black water. The pomace may be further dried and subjected to an extraction process involving an organic solvent, usually hexane.

Figure 9:
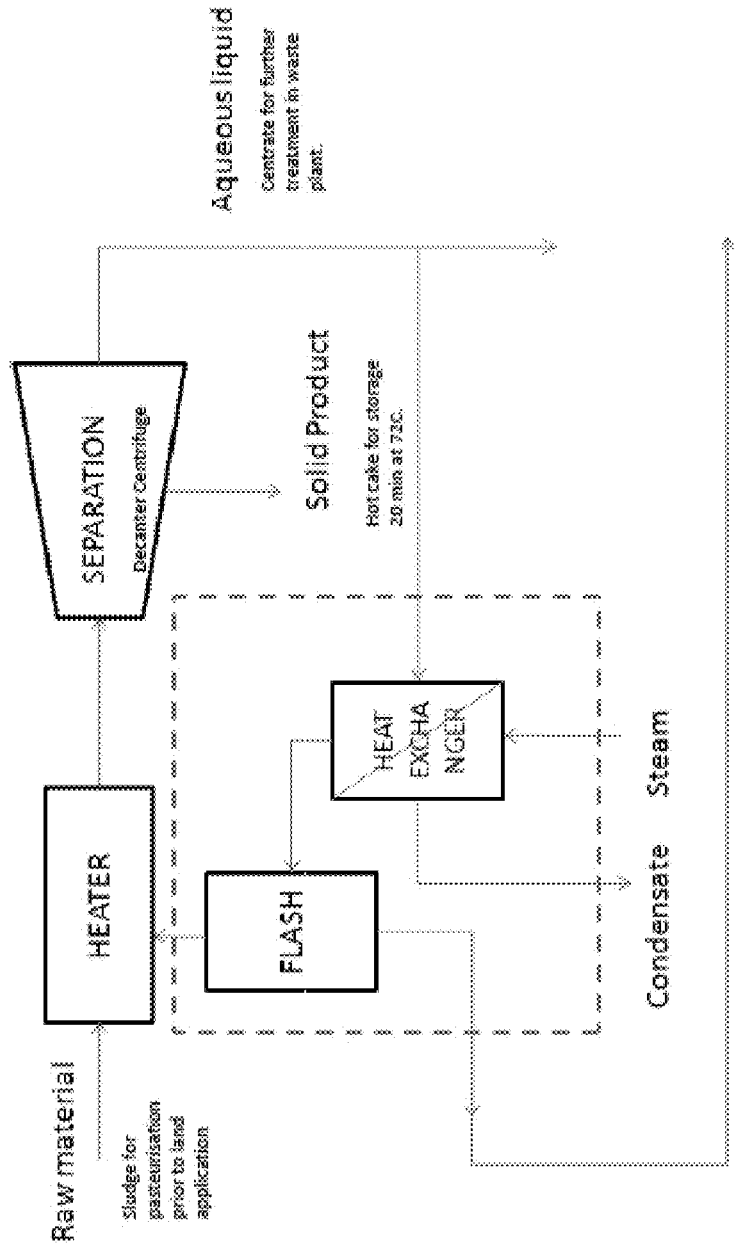
FIG. 9 shows a flow chart of an embodiment in which sludge is pasteurized prior to land application.

FIG. 9 discloses a process for treating sludge. The raw material for the process is a sludge obtained from e.g. a plant for sewage treatment. The sludge may be obtained from the primary sedimentation stage and/or the secondary sedimentation stage used in conventional sewage treatment. In the primary sedimentation stage sewage flows through large tanks, commonly called "primary clarifiers" or "primary sedimentation tanks". The tanks are used to settle sludge while grease and oils rise to the surface and are skimmed off. Primary settling tanks are usually equipped with mechanically driven scrapers that continually drive the collected sludge towards a hopper in the base of the tank where it is collected for the present process. Sludge from the secondary treatment is usually produced by aerating the raw water obtained from the primary sedimentation stage and allowing the aerated raw water to settle in a clarifier. The sludge is collected from the bottom of the clarifier and used in the present process. In certain embodiments also raw material from the tertiary treatment may be used, such as sand used for sand filtration of the residual suspended matter in the treated waste water.

The sludge is heated to a pasteurizing temperature. The temperature is at least 63° C. and does usually not exceed the boiling temperature of the sludge. Usually, the temperature is raised to around 72° C. in the heater with direct steam injection. The first heating unit may be selected as the Pick Constant Flow Direct Steam Injection Heater. Subsequent to the heating the sludge is separated in a hot cake and an aqueous liquid in a separation unit. To allow the pasteurization process to proceed the hot cake may be stored for a while, such as 1 to 30 minutes. As a rule of thumb the storage time is longer when the temperature is closer to the lower limit of the pasteurization temperature. When a pasteurization temperature of 72° C. is selected the storage time at that temperature of the hot cake is usually around 20 min. The separation unit is usually a two phase decanter centrifuge. A part of the aqueous liquid resulting from the separation step is heated indirectly to a temperature of 144° C. in a heat exchanger and pressurized to 4-5 bara. The heated and pressurized aqueous liquid is subjected to a sudden reduction of the pressure to liberate steam. The steam is transferred to the direct steam heater used in the first heating unit. The remaining aqueous liquid is subjected to further treatment, recycled to the second heating unit, or discarded. The part of the aqueous liquid leaving the process directly from the separation unit may be mixed with the concentrated aqueous liquid leaving the flash vessel, or treated separately.

FIG. 10 discloses an embodiment in which wort used in the brewing of beer is produced. In a first step pre-heated wort is supplied to a first heating unit, termed wort boiler on the drawing. The wort boiler is injected with steam for heating of the wort and is further supplied with heat from an external boiler. The wort is usually boiled for 15 to 120 min, where hops are introduced at a certain stage during the boiling process. The wort is subsequently transported by a pump to a whirlpool kettle, which is connected to a decanter centrifuge for separating out solid product such as coagulated proteins and vegetable matter from hops, i.e. trub. A part of the aqueous liquid is pressurized by a pump and increased in temperature in a heat exchanger prior to pressure reduction in a vacuum tank. By the pressure reduction steam is produced for the heating of the wort in the wort boiler. The aqueous liquid reduced in water is mixed with the stream from the whirlpool and is used as the wort in the subsequent brewing process after it has been cooled.

The invention claimed is:
1. A process for producing a solid product and a liquid product, comprising
   a. conveying an optionally pre-treated finely divided starting material to a heating unit,
   b. heating by direct steam injection the starting material to obtain a heated starting material, the heating by direct steam injection occurring while the finely divided starting material is located in the heating unit,
   c. conveying the heated starting material directly, and in the absence of heat transfer from heat exchanger surfaces to the starting material, from the heating unit to a separation unit,
   d. separating the heated starting material into the solid product and an aqueous liquid through operation of the separation unit,
   e. heating and pressurizing the aqueous liquid after the separating of the heated starting material into the solid product and the aqueous liquid, and
   f. reducing the pressure of the aqueous liquid thereby generating steam and the liquid product, the reducing of the pressure of the aqueous liquid occurring immediately after the heating and the pressurizing of the aqueous liquid,
   wherein the steam generated in step f is returned to step b and is directly injected into the finely divided starting material to perform the heating by the direct steam injection.

2. The process of claim 1, wherein the finely divided starting material is pumpable.

3. The process of claim 1, wherein the heating by direct steam injection is performed by a continuous heating unit.

4. The process according to claim 1, wherein the starting material is heated to a temperature of 35° C. or above.

5. The process according to claim 1, wherein the separating unit in which the heated starting material is separated into the solid product and the aqueous liquid is a centrifuge.

6. The process according to claim 5, wherein the centrifuge is a two or three phase decanter centrifuge.

7. The process according to claim 1, wherein the separating of the heated starting material into the solid product and the aqueous liquid is performed in the separating unit by a membrane process.

8. The process according to claim 7, wherein the membrane process is an ultrafiltration or microfiltration process.

9. The process according to claim 1, wherein the aqueous liquid includes lipid components, the process further comprising removing or reducing the lipid components.

10. The process according to claim 9, wherein the lipid components are removed or reduced in a clarification centrifuge.

11. The process according to claim 1, wherein the aqueous liquid is heated to a temperature of 120° C. or above and pressurized to a pressure of 2 bara or above.

12. The process according to claim 1, wherein the aqueous liquid obtained from the separation unit is stored in a buffer tank prior to the heating and the pressurizing of the aqueous liquid.

13. The process according to claim 1, wherein the reducing of the pressure of the aqueous liquid is achieved by flash evaporation.

14. The process according to claim 1, wherein water depleted aqueous liquid from the pressure reduction of step e is at least partly recycled to the heating and pressurising step d.

15. The process according to claim 14, wherein the aqueous liquid is pre-heated by heat exchanging with the water depleted aqueous liquid before the heating and pressurizing of the aqueous liquid in step d.

16. The process according to claim 14, wherein the residual content of the water depleted aqueous liquid phase is increased relative to the aqueous liquid phase to 50% or more.

17. The process according to claim 1, wherein the steam produced by the pressure reduction of step e is of a temperature of 120° C. or above.

18. A process for producing a solid product and a liquid product, comprising:
heating a finely divided starting material by direct steam injection to produce a heated starting material, the finely divided starting material that is heated by direct steam injection being: i) vegetable source material; ii) marine source material; iii) animal source material; iv) or a mixture of the vegetable source material, the marine source material and the animal source material, the heating of the finely divided starting material by direct steam injection occurring while the finely divided starting material is located in a heating unit;
conveying the heated starting material directly, and in the absence of heat transfer from heat exchanger surfaces to the starting material, from the heating unit to a separation unit,
operating the separation unit to separate the heated starting material into the solid product and an aqueous liquid;
heating and pressurizing the aqueous liquid after the separating of the heated starting material into the solid product and an aqueous liquid;
reducing the pressure of the aqueous liquid that has been heated and pressurized to produce steam and the liquid product, the reducing of the pressure of the aqueous liquid occurring immediately after the heating and the pressurizing of the aqueous liquid and occurring in a flash evaporator; and
directly injecting the steam produced by reducing the pressure of the aqueous liquid into the finely divided starting material to perform the heating of the finely divided starting material by the direct steam injection.

19. The process according to claim 18, wherein the heating of the finely divided starting material by direct steam injection to produce a heated starting material comprises heating the finely divided starting material to a temperature of at least 35° C. within 1-5 minutes.

20. The process according to claim 18, wherein: i) the vegetable source material is culture plants of olive, sugar beet, sugar cane, soy bean, wheat, rice, corn, palm oil, wine grape, paper pulp, beer wort, or potato; ii) the marine source material is cod liver oil or blubber; and iii) the animal source material is a meat product from cattle, pig, chicken and turkey.

21. The process according to claim 18, wherein the separating of the heated starting material into the solid product and the aqueous liquid is performed in a separation unit, the process further comprising conveying the aqueous liquid from the separation unit toward a heating unit by way of a pump positioned between the separation unit and the heating unit.

22. The process according to claim 18, wherein the heating and the pressurizing of the aqueous liquid after the separating of the aqueous liquid from the solid product comprises indirectly heating the aqueous liquid to a temperature above a boiling point of the aqueous liquid.

23. A process for producing a solid product and a liquid product, comprising:
heating a finely divided starting material by direct steam injection to produce a heated starting material, the finely divided starting material that is heated by direct steam injection being: i) vegetable source material; ii) marine source material; iii) animal source material; iv) or a mixture of the vegetable source material, the marine source material and the animal source material, the heating of the finely divided starting material by direct steam injection occurring while the finely divided starting material is located in a heating unit;
conveying the heated starting material directly, and in the absence of heat transfer from heat exchanger surfaces to the starting material, from the heating unit to a holding tank at which the temperature of the heated starting material is maintained or increased;
conveying the heated starting material directly, and in the absence of heat transfer from heat exchanger surfaces to the starting material, from the holding tank to a separation unit,
operating the separation unit to separate the heated starting material into the solid product and an aqueous liquid;
heating and pressurizing the aqueous liquid after the separating of the heated starting material into the solid product and an aqueous liquid;
reducing the pressure of the aqueous liquid that has been heated and pressurized to produce steam and the liquid product, the reducing of the pressure of the aqueous liquid occurring immediately after the heating and the pressurizing of the aqueous liquid; and
directly injecting the steam produced by the reducing of the pressure of the aqueous liquid into the finely divided starting material to perform the heating of the finely divided starting material by the direct steam injection.

* * * * *